March 6, 1956
U. HOFFMANN ET AL
2,737,446
PROCESS FOR THE PRODUCTION OF FINELY
DIVIDED SILICA AND ALKALI FORMATES
Filed April 20, 1953
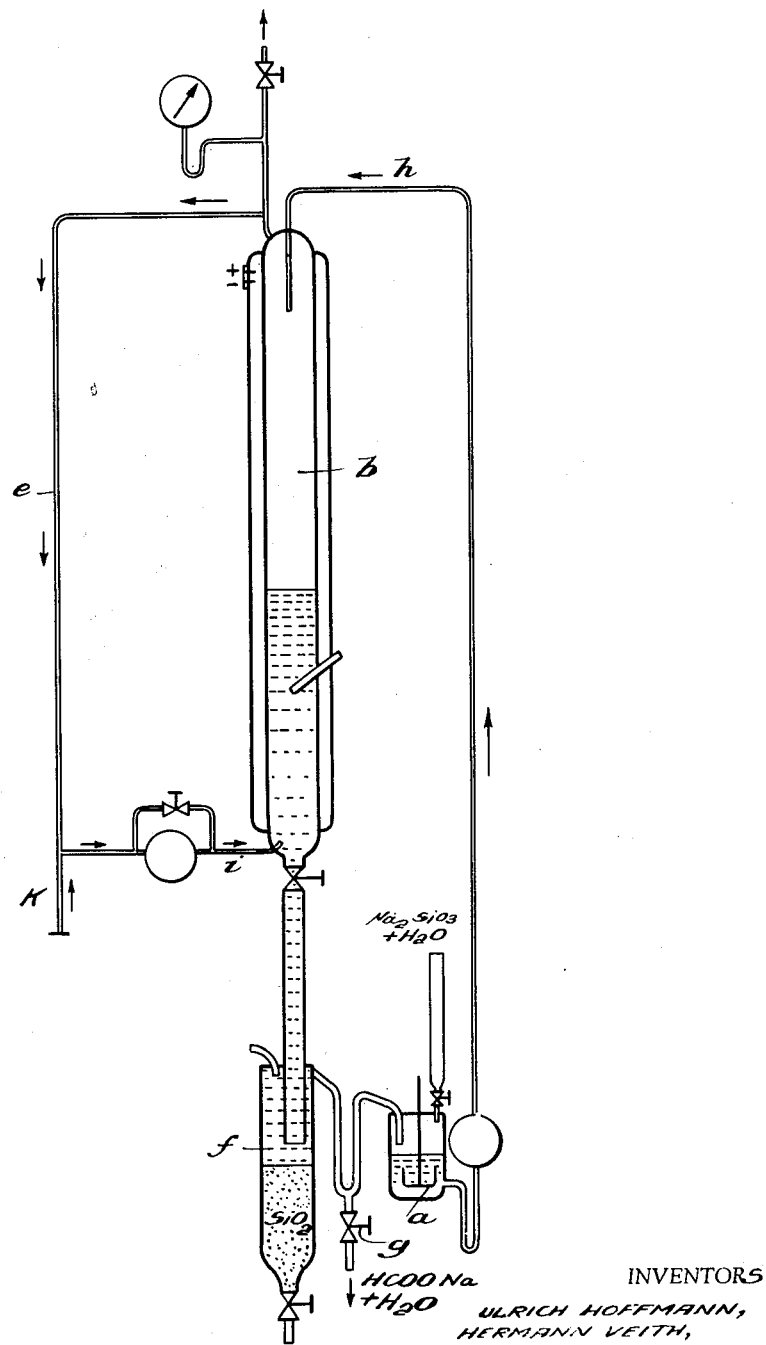
INVENTORS
ULRICH HOFFMANN,
HERMANN VEITH,
BY Bailey, Stephens & Huettig
ATTORNEYS

United States Patent Office

2,737,446
Patented Mar. 6, 1956

2,737,446

PROCESS FOR THE PRODUCTION OF FINELY DIVIDED SILICA AND ALKALI FORMATES

Ulrich Hoffmann, Bad Homburg, and Hermann Veith, Frankfurt am Main, Germany, assignors to Deutsche Gold- und Silber-Scheideanstalt vormals Roessler, Frankfurt am Main, Germany Application April 20, 1953, Serial No. 349,884

Claims priority, application Germany April 24, 1952

7 Claims. (Cl. 23—182)

The present invention relates to a novel process for the production of finely divided silica with the simultaneous production of alkali formates.

Alkali formates generally have been produced by reacting carbon monoxide with alkali or alkaline earth metal hydroxides at elevated pressures.

It has now been found that alkali metal formates and finely divided silica can be simultaneously produced in a smooth reaction between alkali metal silicate solutions and carbon monoxide at only slightly or moderately raised pressures, for example, gauge pressures of 10–40 atmospheres, preferably 15–30 atmospheres and at moderately raised temperatures above 100° C., for example, 120°–200° C., preferably 140°–170° C.

Not only is the production of alkali metal formate from waterglass new, but furthermore, it could in no way be foreseen that the same process would simultaneously produce a valuable silica product in finely divided form.

It was furthermore found that the degree of subdivision and the activity of the precipitated silica produced according to the invention could be varied within wide ranges by very simple measures. For example, it was found that the grain size could be varied by adjusting the concentration of the alkalimetal silicate solution employed as the grain size obtained decreases with increasing dilution of the silicate solution. Furthermore, the fineness of grain and activity of the precipitated silica can be increased with increased intensity of mixing the reactants. The mixing can be achieved with mechanical stirrers or by a gas stream such as, for example, the carbon monoxide employed in the reaction. The following table gives by way of example various values obtained at various concentrations of the silicate solution and at various rates of stirring.

| Conc. of Silicate Sol, per-cent | R. P. M. of the Stirrer | Yield | | Poured Wt. of the SiO₂, g./cm.³ | Viscosity, cps. |
|---|---|---|---|---|---|
| | | SiO₂ | Na Form-ate, per-cent | | |
| 1 | 20 | 45 | 100 | 99.2 | 0.22 | 380 |
| 2 | 20 | 100 | 98.3 | 100 | 0.104 | 1,400 |
| 3 | 20 | 45 | 100 | 97 | 0.185 | 360 |
| 4 | 10 | 45 | 97.8 | 100 | 0.111 | 6,600 |
| 5 | 10 | 100 | 99.3 | 98.7 | 0.115 | 21,000 |

The poured weight given in the second to the last column is a measure of the degree of subdivision of the silica obtained. The viscosities given in the last column are those of a commercial lubricating oil to which 10% of the silica produced has been added. The increase in viscosity is a measure of the activity and subdivision of the silica.

In carrying out the process according to the invention, the action of carbon monoxide upon the alkali metal silicate solution preferably is continued until the alkali metal silicate has been completely transformed into the alkali metal formate. In this way the silica is precipitated in an especially good filterable form. Over acidification of the silicate solution is avoided with certainty in the process according to the invention, as carbon monoxide is taken up by the solution only until the alkali metal component is completely used up. The precipitation of the silica can already begin when the solution is still definitely alkaline and ends by itself when the solution is neutral. Consequently no special control of the hydrogen ion concentration of the reaction mixture is required.

It was furthermore found that the presence of high concentrations of the alkali metal formate produced in the reaction mixture does not substantially influence the course of the reaction or the properties of the precipitated silica so that it is possible to recycle the alkalimetal formate solution after recovery of the precipitated silica therefrom, until highly concentrated formate or even saturated solutions are obtained which require little energy to recover the solid salt therefrom. When the alkali metal formate is recycled, it was found especially advantageous to carry out the process according to the invention continuously.

The accompanying drawing diagrammatically shows an apparatus suitable for carrying out the process according to the invention, and the following example illustrates the manner in which such process can be carried out with reference to the drawing.

The sodium silicate solution is supplied from collecting vessel *a* to the top end of reaction column *b* which is filled to about one half its height with the reaction solution over line *b*. A rapid stream of the carbon monoxide required for the reaction is supplied to the bottom of the column through lines *k* and *i* at a gauge pressure of about 30 atmospheres. As the reaction is greatly dependent upon time, the major quantity of the carbon monoxide does not react during its passage through the reaction column and therefore it simultaneously serves to agitate the reaction solution. The excess carbon monoxide is recirculated over line *e* and is continuously supplemented with fresh carbon monoxide through line *k*. The reacted liquid leaving the bottom of reaction column *b* is supplied to separator *f* to separate the silica formed and a portion of the sodium formate containing solution is supplied to collecting vessel *a* where it is continuously supplemented with fresh sodium silicate solution. The other portion of the sodium formate solution is continuously withdrawn through *g* and worked up to the solid salt. In accordance with a special modification of the process according to the invention the precipitation of the silica is effected in the presence of a protective colloid or dispersible hydrophobic organic materials such as, for example, stearic acid, organic amines and the like. The silica obtained in this manner is even more highly disperse as the precipitated silica is so to say coated in the nascent state with a protective layer of the colloid or hydrophobic material whereby growth of the individual grains is hindered. As the precipitation according to the invention begins on the alkaline side and is completed when the alkalimetal silicate has been completely used up in the formation of the alkalimetal formate, it is possible to employ such materials as stearic acid which provide the protective action in neutral solutions as well as materials such as organic amines which provide a protective action in alkaline solutions.

The use of such hydrophobic substances in the reaction solutions of the invention provides a number of advantages. For example, the filtration of or centrifuging of the silica thus obtained is facilitated to a great degree, as such silica repels water to a much greater degree than silica which has not been rendered hydrophobic. Also the hydrophobic silica obtained is well suited for the production of gelled oils, for example, lubricating greases which are produced by additions of highly disperse solids such as, for example, carbon black and inorganic oxides produced pyrogenically as aerogels. The greases obtained with such hydrophobic silica have improved stability in the presence of water and steam. Furthermore, only small additions of such silica produce a substantial increase in the viscosity of the lubricant.

The silica produced according to the invention possesses properties which give it many different fields of application. It is well suited as a filler for natural and synthetic rubber as well as for synthetic resins of all types such as, for example, obtained by condensation or polymerization. The silica produced according to the invention is especially suited as a reenforcing filler, as it has no coloring action and, therefore, renders it possible to produce colorless or colored rubber or synthetic resins. In addition to its utility in the production of solid lubricants, the silica obtained according to the invention can be employed to thicken other types of liquids, for example, battery acid. Furthermore, it has been found suited as a film strengthener, and sedimentation retardant in lacquers and other painting materials as well as a delustering agent for lacquers and coating compositions. Also, under certain conditions, it can be employed to stabilize the active oxygen in bleaching and washing materials. In addition, it is also suited for the surface treatment of fibrous materials for special effects, for example, for rendering textiles resistant to slippage. Finally, the silica obtained according to the invention can also be employed for such catalytic purposes and as carriers for active materials and perfumes as well as other purposes for which pyrogenically produced silica has been found suited.

EXAMPLES

*Example 1*

A solution containing 100 grs. of water glass (9.74% NaOH and 25.3% $SiO_2$) in 250 grs. of water was filled into a stirring autoclave and kept therein at a gauge pressure of about 25 atmospheres CO at a temperature of about 170° C. In the reaction a quantity of about 6.7 liters of carbon monoxide was taken up instead of the calculated theoretical amount of 5.8 liters. After filtering off of the reaction mixture 25.2 grs. of dry uncalcined silica were obtained whilst 16 grs. of sodium formate could be recovered from the filtrate.

*Example 2*

In a 5 liter pressure column provided with a magnetic stirrer and a locking mechanism at the bottom of the column, 500 grs. of sodium silicate and 2500 grs. of water are filled in and the column then kept one hour at a gauge pressure of 25 atmospheres CO at a temperature of about 170° C. The conversion is then finished. A stream of a solution of 500 grs. of waterglass in 2500 grs. of water is then continuously and hourly passed into the upper end of the column and the outflow of the column regulated in such a way that the same amount of liquid is continuously withdrawn per hour. The stirring was carried out with 130 periods per minute at a constant temperature of about 170° C. From the reacted liquid leaving the bottom of the reaction column 125 grs. of silica are filtered off per hour. The filtrate contained about 3.4% of sodium formate. The hourly portion of the filtrate was mixed with 500 grs. of water glass and the mixture then recycled to the reaction column in the same period until the cycling solution was concentrated up to about 20% of sodium formate. The filtrate was then worked up to solid sodium formate and the necessary quantity of waterglass in 2500 grs. of water hourly supplied to the reaction column.

*Example 3*

A solution of 100 grs. of soda waterglass in 250 grs. of water is mixed with an aqueous solution containing 1 gram of methylamine with a further addition of 10 grs. of stearylic amine. This mixture is then heated in an autoclave at a gauge pressure of 25 atmospheres CO at a temperature of about 170° C. whilst stirring. After precipitation of the solid reaction product 26.1 grs. of hydrophobic silica (only dried) were obtained. 16 grs. of sodium formate were recovered from the filtrate.

We claim:

1. A process for the production of finely divided silica and an alkali metal formate which comprises reacting an aqueous solution of an alkali metal silicate with carbon monoxide at a temperature over 100° C. and at an elevated pressure of at least 10 atmospheres and separating the precipitated silica from the reaction solution containing the alkali metal formate formed.

2. A process in accordance with claim 1 in which said reaction is carried out in the presence of stearic acid.

3. A process in accordance with claim 1 in which said reaction is carried out in the presence of methyl amine.

4. A process in accordance with claim 1 in which said reaction is carried out in the presence of stearyl amine.

5. A process for the production of finely divided silica and an alkali metal formate which comprises reacting an aqueous solution of an alkali metal silicate with carbon monoxide at a temperature between 120° C. and 200° C. and a gauge pressure between 10 and 40 atmospheres and separating the precipitated silica from the reaction solution containing the alkali metal formate formed.

6. A process for the production of finely divided silica and an alkali metal formate which comprises reacting an aqueous solution of an alkali metal silicate with carbon monoxide at a temperature between 140° and 170° C. and a gauge pressure between 15 and 30 atmospheres and separating the precipitated silica from the reaction solution containing the alkali metal formate formed.

7. A process for the production of finely divided silica and an alkali metal formate which comprises reacting an aqueous solution of an alkali metal silicate with carbon monoxide at a temperature over 100° C. and at an elevated pressure of at least 10 atmospheres, separating the precipitated silica from the reaction solution containing the alkali metal formate formed, replacing the alkali metal silicate which has been reacted, and recycling such solution until in the resulting reaction solution, a saturated formate solution is obtained.

References Cited in the file of this patent

UNITED STATES PATENTS

| | | |
|---|---|---|
| 820,159 | Weise et al. | May 8, 1906 |
| 993,331 | Wiens | May 23, 1911 |
| 1,833,865 | Luscher | Nov. 24, 1931 |
| 2,023,003 | Carpenter | Dec. 3, 1935 |
| 2,348,072 | Kanhofer | May 2, 1944 |

FOREIGN PATENTS

| | | |
|---|---|---|
| 4,471 | Great Britain | July 30, 1908 |